United States Patent
Zhang et al.

(10) Patent No.: US 12,435,167 B2
(45) Date of Patent: Oct. 7, 2025

(54) PROCESSES FOR PRODUCING POLYOLEFINS AND IMPACT COPOLYMERS WITH BROAD MOLECULAR WEIGHT DISTRIBUTION AND HIGH STIFFNESS

(71) Applicant: EXXONMOBIL CHEMICAL PATENTS INC., Baytown, TX (US)

(72) Inventors: Xiaodan Zhang, Houston, TX (US); Christopher G. Bauch, Seabrook, TX (US); Lubin Luo, Houston, TX (US); Jeffrey L. Brinen, League City, TX (US); George J. Pehlert, Houston, TX (US); Todd S. Edwards, League City, TX (US); Sung A. Kim, Houston, TX (US)

(73) Assignee: EXXONMOBIL CHEMICAL PATENTS INC., Baytown, TX (US)

( * ) Notice: Subject to any disclaimer, the term of this patent is extended or adjusted under 35 U.S.C. 154(b) by 889 days.

(21) Appl. No.: 17/640,172

(22) PCT Filed: Aug. 14, 2020

(86) PCT No.: PCT/US2020/046301
§ 371 (c)(1),
(2) Date: Mar. 3, 2022

(87) PCT Pub. No.: WO2021/045889
PCT Pub. Date: Mar. 11, 2021

(65) Prior Publication Data
US 2022/0332864 A1    Oct. 20, 2022

Related U.S. Application Data

(60) Provisional application No. 62/896,064, filed on Sep. 5, 2019.

(51) Int. Cl.
*C08F 10/06* (2006.01)
*C08F 210/06* (2006.01)

(52) U.S. Cl.
CPC .................................. *C08F 210/06* (2013.01)

(58) Field of Classification Search
None
See application file for complete search history.

(56) References Cited

U.S. PATENT DOCUMENTS

2017/0267794 A1*  9/2017  Lin ...................... C08F 210/06

FOREIGN PATENT DOCUMENTS

| EP | 2796500 A1 | 10/2014 |
| EP | 3453727 A1 | 3/2019 |

(Continued)

OTHER PUBLICATIONS

International Search Report and Written Opinion for corresponding PCT application PCT/US2020/046301, dated Feb. 8, 2021.

*Primary Examiner* — Richard A. Huhn
(74) *Attorney, Agent, or Firm* — Vorys, Sater, Seymour and Pease LLP (57) ABSTRACT

Provided herein are methods of polymerizing α-olefin monomer with a catalyst and hydrogen in a slurry to produce low molecular weight polyolefins. Hydrogen is vented from the low molecular weight polyolefins and then the low molecular weight polyolefins are further polymerized in a gas phase to produce a polyolefin having a molecular weight distribution of between 4.0 and 30 and a flexural modulus between 1500 mPa and 2500 mPa.

20 Claims, 5 Drawing Sheets

(56) References Cited

FOREIGN PATENT DOCUMENTS

| WO | 2009129873 | A1 | 10/2009 |
| WO | 2011076611 | A1 | 6/2011 |
| WO | 2013010877 | A1 | 1/2013 |
| WO | 2018122263 | A1 | 7/2018 |
| WO | 2019089111 | A1 | 5/2019 |

* cited by examiner

PROCESSES FOR PRODUCING POLYOLEFINS AND IMPACT COPOLYMERS WITH BROAD MOLECULAR WEIGHT DISTRIBUTION AND HIGH STIFFNESS

CROSS-REFERENCE OF RELATED APPLICATION

This application claims the benefit of U.S. Provisional Application No. 62/896,064, filed Sep. 5, 2019, the disclosure of which is incorporated herein by reference.

FIELD OF THE INVENTION

The present invention is directed to methods of polymerizing α-olefin monomer to produce polyolefins and impact copolymers having a broad molecular weight distribution and high stiffness.

BACKGROUND OF THE INVENTION

Flexural modulus (stiffness) is an important property for polyolefins, particularly polypropylene and impact polypropylene copolymers (ICP). Likewise, broad molecular weight distribution is important as it further combines desirable mechanical properties with good processability. Typically, however, polyolefins with broad molecular weight distribution are processed through the use of reactor cascades where polyolefin of different molecular weights are produced in different reactors, and the polymer components later combined.

Melt blending of polymer components, however, often yields poor results. Furthermore, separately producing fractions increases production costs. Moreover, to ultimately obtain a polyolefin having broad molecular weight distribution, insufficient homogeneity of product can result.

A need exists therefore, for methods of producing polyolefins having broad molecular weight distribution and high stiffness without blending polymers of different average molecular weights.

SUMMARY OF THE INVENTION

Provided herein are new methodologies for producing polyolefins with high stiffness. The methods comprise the steps of: (a) polymerizing α-olefin monomers with a catalyst and hydrogen in a slurry to produce a low molecular weight polyolefin; (b) venting hydrogen from the low molecular weight polyolefin; and (c) polymerizing the low molecular weight polyolefin in a gas phase to produce a polyolefin having a molecular weight distribution of between 4.0 and 20, and a flexural modulus between 1500 mPa and 2500 mPA. In any embodiment, the mole ratio of hydrogen to α-olefin monomer in the gas phase is reduced to between 0 to 0.01. In any embodiment, the α-olefin monomer is propylene and the polyolefin, polypropylene. Optionally, the present methods include further include the step of polymerization of the polyolefin with a comonomer in a second gas phase to provide an impact copolymer. In any embodiment, the polyolefin is a bimodal polyolefin comprising a low molecular weight component and a high molecular weight component.

The present methods for producing polypropylene can be implemented in a commercial process and in commercial process equipment. In this case, the methods include contacting a propylene monomer with a catalyst in hydrogen in a slurry polymerization reactor to produce an effluent of low molecular weight polypropylene, hydrogen, propylene monomer and catalyst. Prior to feeding a gas phase polymerization reactor, hydrogen is vented from the effluent. Low molecular weight polypropylene is then fed into a gas phase polymerization reactor to produce polypropylene having a molecular weight distribution (Mw/Mn) between 4.0 to 20.0 and flexural modulus between 1500 MPa to 2500 MPa. In any embodiment, the polypropylene is bimodal polypropylene comprising a low molecular weight component and the high molecular weight component. In any embodiment, the effluent is continuously or intermittently withdrawn from the slurry polymerization reactors. In any embodiment, a prepolymerization step is performed prior to slurry polymerization or a second gas phase polymerization for producing impact copolymers. In any embodiment, the method further comprises a step of polymerizing polypropylene in a second gas phase polymerization reactor to produce an impact copolymer.

DETAILED DESCRIPTION OF THE INVENTION

For the purposes of this disclosure, the following definitions will apply:

As used herein, the terms "a" and "the" as used herein are understood to encompass the plural as well as the singular.

The term "density" refers to the density of a polymer independent of any additives, such as antiblocks, which may change the tested value. Density is measured in accordance with ASTM D-1505.

The term "venting" refers to removal of a gaseous species from one or more other gaseous species and/or liquids and/or solids, such as the separation of hydrogen from liquid propylene and/or propane that may contain polymer solids; and such term "venting" is not limited to physical means but can include chemical removal such as by reaction of a gas such as hydrogen with a chemical compound such as a titanocene or other hydrogenation catalyst or scavenger as is known in the art, or by exposure to a permeable-selective membrane to physically separate one gas such as hydrogen from a liquid or collection of gases and liquids, or by physical means such as a change in pressure and/or temperature such as a purge system.

The term "hydrogenation catalyst" refers to a chemical composition that is active to promote the reaction of an α-olefinic monomer with hydrogen in such a way to either transform it to another substance (e.g., combine with an alkene to form an alkane), or bind it and reduce or eliminate its further reactivity. Desirably, the hydrogenation catalyst is selected such that it is substantially inactive for the promotion of polymerization of olefinic monomers. Metals, supported or not, such as palladium and/or platinum can be suitable hydrogenation catalysts. Some hydrogenation catalysts require an "activator" such as an aluminum alkyl compound or blend of such compounds.

The term "impact copolymer," "ICP" or "polypropylene impact copolymer" or simply "impact copolymer" refers to a combination, typically heterophasic, of crystalline and amorphous polymers, such as, for example, iso-polypropylene ("iPP") and rubber, which provide the ICP with both stiffness and toughness, i.e., a stiffness greater than that of one or more of the amorphous polymer(s) and a toughness greater than that of one or more of the crystalline polymer(s). An ICP can have a morphology such that the matrix phase comprises a higher proportion of the crystalline polymer, and a rubber is present in a higher proportion in a dispersed or co-continuous phase, e.g., a blend comprising 60 to 95 wt % of a matrix of iPP, and 5 to 40 wt % of an ethylene, propylene or other polymer with a Tg of −30° C. or less.

As used herein, "$M_n$" is number average molecular weight, "$M_w$" is weight average molecular weight, and "$M_z$" is z-average molecular weight. Unless otherwise noted, all molecular weight units (e.g., $M_w$, $M_n$, $M_z$) including molecular weight data are in the unit of g·mol$^{-1}$.

Molecular Weight Distribution ("MWD") is equivalent to the expression $M_w/M_n$. The expression $M_w/M_n$, is the ratio of the $M_w$ to the $M_n$. The $M_w$ is given by $$M_w = \frac{\sum_i n_i M_i^2}{\sum_i n_i M_i}$$

the $M_n$ is given by $$M_n = \frac{\sum_i n_i M_i}{\sum_i n_i}$$

the $M_z$ is given by $$M_z = \frac{\sum_i n_i M_i^3}{\sum_i n_i M_i^2}$$

where $n_i$ in the foregoing equations is the number fraction of molecules of molecular weight $M_1$. Measurements of $M_w$, $M_z$, and $M_n$ are typically determined by Gel Permeation Chromatography as disclosed in Macromolecules, Vol. 34, No. 19, pg. 6812 (2001). The measurements proceed as follows. Gel Permeation Chromatography (Agilent PL-220), equipped with three in-line detectors, a differential refractive index detector ("DRI"), a light scattering (LS) detector, and a viscometer, is used. Experimental details, including detector calibration, are described in: T. Sun, P. Brant, R. R. Chance, and W. W. Graessley, Macromolecules, Volume 34, Number 19, pp. 6812-6820, (2001). Three Agilent PLgel 10 µm Mixed-B LS columns are used. The nominal flow rate is 0.5 mL/min, and the nominal injection volume is 300 µL. The various transfer lines, columns, viscometer and differential refractometer (the DRI detector) are contained in an oven maintained at 145° C. Solvent for the experiment is prepared by dissolving 6 grams of butylated hydroxytoluene as an antioxidant in 4 liters of Aldrich reagent grade 1,2,4-trichlorobenzene (TCB). The TCB mixture is then filtered through a 0.1 µm Teflon filter. The TCB is then degassed with an online degasser before entering the GPC-3D. Polymer solutions are prepared by placing dry polymer in a glass container, adding the desired amount of TCB, then heating the mixture at 160° C. with continuous shaking for 2 hours. All quantities are measured gravimetrically. The TCB densities used to express the polymer concentration in mass/volume units are 1.463 g/ml at 21° C. and 1.284 g/ml at 145° C. The injection concentration is from 0.5 to 2.0 mg/ml, with lower concentrations being used for higher molecular weight samples. Prior to running each sample, the DRI detector and the viscometer are purged. The flow rate in the apparatus is then increased to 0.5 ml/minute, and the DRI is allowed to stabilize for 8 hours before injecting the first sample. The LS laser is turned on at least 1 to 1.5 hours before running the samples. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 145° C. and λ=690 nm. Units on parameters throughout this description of the GPC-3D method are such that concentration is expressed in g/cm$^3$, molecular weight is expressed in g/mole, and intrinsic viscosity is expressed in dL/g.

Unless otherwise indicated, the distribution and the moments of molecular weight ($M_w$, $M_n$, $M_w/M_n$, etc.), the comonomer content ($C_2$, $C_3$, $C_6$, etc.), and the branching index ($g'_{vis}$) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-µm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1 µm Teflon filter and degassed with an online degasser before entering the GPC instrument. The nominal flow rate is 1.0 ml/min and the nominal injection volume is 200 µL. The whole system including transfer lines, columns, and detectors are contained in an oven maintained at 145° C. The polymer sample is weighed and sealed in a standard vial with 80 µL flow marker (Heptane) added to it. After loading the vial in the autosampler, polymer is automatically dissolved in the instrument with 8 ml added TCB solvent. The polymer is dissolved at 160° C. with continuous shaking for 1 hour for most PE samples or 2 hours for PP samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c) at each point in the chromatogram is calculated from the baseline-subtracted IR5 broadband signal intensity (I) using the following equation: c=βI, where β is the mass constant. The mass recovery is calculated from the ratio of the integrated area of the concentration chromatography over elution volume and the injection mass which is equal to the pre-determined concentration multiplied by injection loop volume.

The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with the following equation:

$$\log M = \frac{\log(K_{PS}/K)}{a+1} + \frac{a_{PS}+1}{a+1}\log M_{PS}$$

where the variables with subscript "PS" stand for polystyrene while those without a subscript are for the test samples. In this method, $\alpha PS=0.67$ and $KPS=0.000175$ while $\alpha$ and K are for other materials as calculated and published in literature (Sun, T. et al., Macromolecules, 2001, 34, 6812), except that for purposes of the present disclosure, $\alpha=0.695$ and $K=0.000579$ for linear ethylene polymers, $\alpha=0.705$ and $K=0.0002288$ for linear propylene polymers, $\alpha=0.695$ and $K=0.000181$ for linear butene polymers, $\alpha$ is 0.695 and K is $0.000579*(1-0.0087*w2b+0.000018*(w2b)^2)$ for ethylene-butene copolymer where w2b is a bulk wt. % of butene comonomer, $\alpha$ is 0.695, and K is $0.000579*(1-0.0075*w2b)$ for ethylene-hexene copolymer where w2b is a bulk wt. % of hexene comonomer, and $\alpha$ is 0.695 and K is $0.000579*(1-0.0077*w2b)$ for ethylene-octene copolymer where w2b is a bulk wt. % of octene comonomer. Concentrations are expressed in g/cm$^3$, molecular weight is expressed in g/mole, and intrinsic viscosity (hence K in the Mark-Houwink equation) is expressed in dL/g unless otherwise noted.

The term "olefin" refers to a linear, branched, or cyclic compound comprising carbon and hydrogen and having a hydrocarbon chain containing at least one carbon-to-carbon double bond in the structure thereof, where the carbon-to-carbon double bond does not constitute a part of an aromatic ring. The term "olefin" as used herein includes all structural isomeric forms of olefins, unless it is specified to mean a single isomer or the context clearly indicates otherwise.

For example, an α-olefin monomer can refer to an α-olefin that is capable of polymerization by the insertion (Ziegler-Natta) mechanism. An α-olefin can be a compound having the structure CH$_2$=CHR, wherein R is a linear or cyclic alkyl group. Typical α-olefin monomers include propene (R=—CH$_3$), butene-1 (R=—CH$_2$CH$_3$), 4-methylpentene-1 (R=CH$_2$CH(CH$_3$)$_2$), hexene-1 (R=—(CH$_2$)$_3$CH$_3$) and octene-1 (R=—(CH$_2$)$_5$CH$_3$). In addition, an α-olefin polymer refers to an α-olefin homopolymer or copolymer. As monomers to be copolymerized can, in addition to α-olefin monomers of the above-mentioned type, also be used ethene.

A "separation," "separator" or "separation step," includes a process or method of separating unreacted olefin monomer from polyolefin that has formed, for example, from a polymerization medium, such as by physical separation and/or separation by heating and/or pressure changes to the mixture, and refers to the separation of propylene from forming polypropylene, ethylene-propylene copolymer and/or the impact copolymer.

The term "polymer" refers to a polyolefin having two or more of the same or different "mer" units. A "homopolymer" is a polymer having mer units that are the same. A "copolymer" is a polymer having two or more mer units that are different from each other. A "terpolymer" is a polymer having three mer units that are different from each other. "Different" in reference to mer units indicates that the mer units differ from each other by at least one atom or are different isomerically.

As used in slurry polymerization, the term "polymerization medium" refers to a mixture of liquids, gases and/or solids comprising α-olefin monomer and one or more catalyst components such as solid Ziegler-Natta polymerization catalyst. In the slurry, polymerization medium can further include activators for the polymerization catalyst, hydrogen as a chain terminating agent, and one or more external electron donors.

As used in the gas phase polymerization, the term "polymerization medium" refers to polyolefin together with α-olefin monomer, one or more catalyst component, and, optionally a comonomer to produce impact copolymer as described herein.

As used herein, the terms "polymerization temperature" and "reactor temperature" are interchangeable.

The term "polypropylene" refers to both homopolymers of propylene monomer (propylene-derived units) and copolymers of propylene.

A "reactor" is any type of vessel or containment device in any configuration of one or more reactors, and/or one or more reaction zones, wherein a similar polymer is produced; however, two or more reactors that are fluidly connected with one another may each produce a different polymer.

As used herein, the terms "slurry polymerization," "a slurry," and "in a slurry polymerization reactor" each refer to a process where an α-olefin (i.e., propylene) is partly dissolved or not dissolved in the polymerization medium. During slurry polymerization, catalyst components, solvent, α-olefins and hydrogen can be passed under pressure to one or more slurry polymerization reactors. Typically, catalyst components are fed to the slurry polymerization reactor as a mixture in aliphatic hydrocarbon solvent, in oil, a mixture thereof, or as a dry powder.

The term "gas phase polymerization reactor" refers to a gas phase reactor of the second stage of the polymerization process of the present methods where high molecular weight polyolefin is produced. The term "second gas phase polymerization reactor" refers to an optional gas phase reactor or polymerization process where comonomer and polyolefin are reacted to produce an impact copolymer.

As used herein, percent by mole is expressed as "mol. %," and percent by weight is expressed as "wt. %."

Provided herein are new methodologies for producing polyolefins and impact copolymers. The methods comprise the steps of: polymerizing an α-olefin monomer with a catalyst and hydrogen in a slurry to produce low molecular weight polyolefins; venting hydrogen from the low molecular weight polyolefins; and polymerizing the low molecular weight polyolefins in a gas phase to produce a polyolefin having a molecular weight distribution of between 4.0 and 20 and a flexural modulus between 1500 mPa and 2500 mPA. A mole ratio of hydrogen to α-olefin monomer in the gas phase is between 0 to 0.01. In any embodiment, the α-olefin monomer is propylene and the polyolefin is polypropylene. Optionally, the present methods include polymerization of bimodal polyolefin with a comonomer in a second gas phase to provide a high molecular weight impact copolymer.

The present methods for producing polypropylene include contacting a propylene monomer with a catalyst in hydrogen in a slurry polymerization reactor to produce an effluent of low molecular weight polypropylene, hydrogen, propylene monomer and catalyst. Prior to feeding a gas phase polymerization reactor, hydrogen is vented from the effluent. Low molecular weight polypropylene is then fed into a gas phase polymerization reactor to produce the polypropylene having molecular weight distribution (Mw/Mn) between 1.0 to 10.0 and flexural modulus between 1675 MPa to 2000 MPa. In any embodiment, the effluent is continuously or intermittently withdrawn from the slurry polymerization reactors. In any embodiment, the α-olefin monomer undergoes a prepolymerization step described immediately below.

Prepolymerization

In any embodiment, prepolymerization can be continuous where a liquid phase includes α-olefin monomer (i.e., propylene) together with minor amounts of other reactants and optionally inert components dissolved therein. In any embodiment, prepolymerization can be performed in a continuous stirred tank reactor or a loop reactor. A prepolymerization reaction can be conducted at a temperature of 0 to 60° C., from 10 to 50° C., or from 20 to 45° C. Pressure of the prepolymerization reaction is not critical, but must maintain the reaction mixture in liquid phase, such as from 275 to 1435 psig, or 420 to 1000 bar.

In a prepolymerization step, α-olefin monomers can be fed into a prepolymerization stage. The amount of prepolymer (α-olefin monomer) on a catalyst can be from 10 to 1000 g per g of the solid catalyst component, or from 50 to 500 g per g of the solid catalyst component. Catalyst particles can be recovered from a continuous stirred prepolymerization reactor, but may not all contain the same amount of prepolymer. Instead, each particle has its own characteristic amount which depends on the residence time of that particle in the prepolymerization reactor. As some particles remain in the reactor for a relatively long time and some for a relatively short time, then also the amount of prepolymer on different particles is different and some individual particles can contain an amount of prepolymer which is outside the above limits.

Catalyst components can be introduced in the prepolymerization step. In any embodiment, a solid catalyst component and co-catalyst can be fed separately. For example, a portion of cocatalyst can be introduced into the prepolymerization stage and a second portion can be fed into subsequent polymerization stages. Other components can be added in the prepolymerization stage, such as chain transfer agents, antistatic agents, promoters, scavenging agents, and the like.

In any embodiment, a catalyst can include a Ziegler-Natta catalyst, such as a catalyst that includes a solid titanium catalyst component that can include titanium as well as magnesium, halogen, at least one non-aromatic "internal" electron donor, and at least one "external" electron donors. The solid titanium catalyst component can be prepared by contacting a magnesium compound, a titanium compound, and at least the internal electron donor. Examples of the titanium compound used in the preparation of the solid titanium catalyst component include tetravalent titanium compounds having the formula $Ti(OR_n)X_{4-n}$, wherein "R" is a hydrocarbyl radical, "X" is a halogen atom, and "n" is from 0 to 4. For purposes of this disclosure, a hydrocarbyl radical is defined to be $C_1$ to $C_{20}$ radicals, or $C_1$ to $C_{10}$ radicals, or $C_6$ to $C_{20}$ radicals, or $C_7$ to $C_{21}$ radicals, any of which may be linear, branched, or cyclic where appropriate (aromatic or non-aromatic).

In any embodiment, the halogen-containing titanium compound can be a titanium tetrahalide, or titanium tetrachloride. In any embodiment, the magnesium compound used in the preparation of the solid titanium catalyst component includes a magnesium compound having reducibility (or capable of alkyl substitution) and/or a magnesium compound having no reducibility. Suitable magnesium compounds having reducibility may, for example, be magnesium compounds having a magnesium-carbon bond or a magnesium-hydrogen bond.

Examples of useful magnesium compounds include dimethyl magnesium, diethyl-magnesium, dipropyl magnesium, dibutyl magnesium, diamyl magnesium, dihexyl magnesium, didecyl magnesium, magnesium ethyl chloride, magnesium propyl chloride, magnesium butyl chloride, magnesium hexyl chloride, magnesium amyl chloride, butyl ethoxy magnesium, ethyl butyl magnesium, and/or butyl magnesium halides. In combination with the magnesium compound, the titanium-based Ziegler-Natta catalyst is said to be supported, thus the solid part of the catalyst.

In any embodiment, the Ziegler-Natta catalysts are used in combination with an activator, also referred to herein as a Ziegler-Natta activator. In any embodiment, compounds containing at least one aluminum-carbon bond in the molecule may be utilized as the activators, also referred to herein as an organoaluminum activator. Suitable organoaluminum compounds include organoaluminum compounds of the general formula $R^1{}_m Al(OR^2)_n H_p X_q$, wherein $R^1$ and $R^2$ are identical or different, and each represents a $C_1$ to Cis hydrocarbyl radical (alkyl or aryl), a $C_1$ to $C_4$ alkyl; "X" represents a halogen atom; and "m" is 1, 2, or 3; "n" is 0, 1, or 2; "p" is 0, 1, 2, or 3; and "q" is 0, 1, or 2; and wherein m+n+p+q=3. Other suitable organoaluminum compounds include complex alkylated compounds of aluminum represented by the general formula $M^1 AlR^1{}_4$, wherein $M^1$ is lithium, sodium, or potassium, and $R^1$ is as defined above. Suitable examples of the organoaluminum compounds include trialkyl aluminums such as trimethyl aluminum, triethyl aluminum and tributyl aluminum; trialkenyl aluminums such as triisoprenyl aluminum; dialkyl aluminum alkoxides such as diethyl-aluminum ethoxide and dibutyl aluminum ethoxide; alkyl aluminum sesquialkoxides such as ethyl aluminum sesquiethoxide and butyl aluminum sesquibutoxide.

Electron donors present with the metal components described above in forming the catalyst suitable for producing the polypropylenes described herein include "internal" and "external" electron donors. In any embodiment, an internal electron donor may be used in the formation reaction of the catalyst as the transition metal halide is reacted with the metal hydride or metal alkyl. Examples of suitable internal electron donors include amines, amides, ethers, esters, ketones, nitriles, phosphines, stilbenes, arsines, phosphoramides, thioethers, thioesters, aldehydes, alcoholates, and salts of organic acids, any of which may include an aromatic group. The internal electron donors can be part of the solid catalyst component, while the external electron donors can be added separately from the solid catalyst component.

In any embodiment, an internal donor can be non-aromatic. The non-aromatic internal electron donor may include an aliphatic amine, amide, ester, ether, ketone, nitrile, phosphine, phosphoramide, thioethers, thioester, aldehyde, alcoholate, carboxylic acid, or a combination thereof. In any embodiment, the non-aromatic internal electron donor(s) include a substituted or unsubstituted $C_4$ to $C_{10}$ or $C_{20}$ di-, tri-, or tetra-ether or glycol, a substituted or unsubstituted $C_4$ to $C_{10}$ or $C_{20}$ carboxylic acid or carboxylic acid ester that may include one or more ether groups, or a combination of two or more such compounds. By "substituted" what is meant is that the compound may include groups such as hydroxides, amines, silanes, or a combination thereof. In any embodiment, the one or more compounds includes secondary or tertiary carbon atoms (thus iso- or tert-hydrocarbon compounds).

In any embodiment, at least one, and two or more external electron donors are used in combination with the solid Ziegler-Natta catalyst component, as long as one of them is an amino-silane donor. External donors can be added to the polymerization reactors as a separate component along with the catalyst and activator. As used herein, an "amino-silane" donor is an external electron donor having at least one amine or alkylamine moiety and at least one silane, alkylsilane or siloxane moiety. In any embodiment, the external electron donors may include an organic silicon compound of the general formula $R^1{}_4Si$ and/or $R^1{}_nSi(NR^2{}_2)_{4-n}$, wherein each R' is independently selected from hydrogen, $C_1$ to $C_{10}$ linear and branched alkyls and alkenes, $C_4$ to $C_{12}$ cycloalkyls and cycloalkenes, $C_5$ to $C_{14}$ aryls, $C_6$ to $C_{20}$ alkylaryls, $C_1$ to $C_{10}$ linear or branched alkoxys, $C_4$ to $C_{12}$ cycloalkoxys, $C_5$ to $C_{14}$ aryloxys, and $C_6$ to $C_{20}$ alkylaryloxys; each $R^1$ is independently selected from C1 to C6 linear, branched and cyclic alkyls or alkoxys; and each $R^2$ is independently selected from hydrogen, $C_1$ to $C_{10}$ linear and branched alkyls and alkenes, $C_4$ to $C_{12}$ cycloalkyls and cycloalkenes, $C_5$ to $C_{14}$ aryls, and C6 to C20 alkylaryls; each $R^2$ is independently selected from $C_1$ to $C_5$ linear or branched alkyls; and wherein "n" is 0, 1, 2, or 3.

Examples of the suitable organosilicon and/or aminosilane compounds include dimethylamino-triethoxysilane, diethylamino-triethoxysilane, vinylethylamino-triethoxysilane, dipropylamino-triethoxysilane, dimethylamino-trimethoxysilane, dimethylamino-tripropylsilane, diethylamino-dicyclopentylmethoxysilane, diethylamino-dimethoxy-cyclohexylsilane, dipropylamino-vinyldimethoxysilane, trimethylmethoxysilane, trimethylethoxysilane, dimethyldimethoxysilane, dimethyldimethoxysilane, dimethyldiethoxysilane, diisopropyldiethoxysilane, t-butylmethyl-n-diethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldimethoxysilane, bisethylphenyldimethoxysilane, dicyclohexyldiethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, t-butyltriethoxysilane, n-butyltriethoxysilane, isobutyltriethoxysilane, phenyltriethoxysilane, γ-aminopropyltriethoxysilane, chlorotriethoxysilane, vinyltributoxysilane, cyclohexyltrimethoxysilane, cyclohexyltriethoxysilane, 2-norbornanetriethoxysilane, 2-norbornanemethyldimethoxysilane, ethylsilicate, butylsilicate, trimethylphenoxysilane, methylallyloxysilane, vinyltris(β-methoxyethoxysilane), vinyltriacetoxysilane, dimethyltetraethoxydisiloxane, tetraethoxysilane, methylcyclohexyldimethoxysilane, propyltriethoxysilane, and/or dicyclopentyldimethoxysilane.

In any embodiment, the external electron donor consists of only one or more amino-silane donors. Different external electron donors may be added in the first and/or second or more loop reactors to effect the polypropylene properties such as making the polypropylene bimodal in MFR, molecular weight, crystallinity, or some other property. In an aspect, one external electron donor is added throughout, and at the same concentration. In any embodiment, the combined concentration of external electron donors can be present with the catalyst and olefin monomer(s) in the reactor between 5 ppm, 10 ppm, 20 ppm to 80, 100, and 120 ppm, based on the total olefin concentration.

The concentration of the Ziegler-Natta catalyst in the polymerization system can be 2 ppm, 4 ppm, 8 ppm to 20 ppm, 40 ppm, 60 ppm, and 100 ppm based on the total olefin concentration. The organoaluminum activator is present in an amount sufficient to produce between 0.1 to 500 g, and between 0.3 to 300 g of a polypropylene per gram of the titanium catalyst present, and can present between 0.1 to 100 moles, and from 0.5 to 50 moles, per mole of the titanium atom present in the catalyst component. Stated another way, the organoaluminum activator can be added in the amount of 10 ppm, 20 ppm, 40 ppm to 80 ppm, 100 ppm, 140 ppm, 180 ppm and 200 ppm based on the total olefin concentration.

Slurry Polymerization

The present methods include slurry polymerization. In a slurry, α-olefins are polymerized to produce polyolefins. In the slurry polymerization reactor, polyolefin particles are formed and suspended in α-olefin monomer as well as catalyst that is fragmented and dispersed within the polyolefin particles. During slurry polymerization, the slurry is agitated to enable the transfer of reactants from the polymerization medium into the polyolefin particles.

Slurry polymerization is referred to sometimes as "bulk polymerization," or a "bulk slurry." Slurry polymerization is conducted in liquid α-olefin monomer with or without an inert diluent. In any embodiment, α-olefin monomers used in commercial production can contain some fraction of aliphatic hydrocarbons as impurities. For example, the α-olefin monomer can contain up to 5% of propane as an impurity. The α-olefin monomer is polymerized in the slurry polymerization reactor. Unreacted α-olefin monomer can be recycled from the effluent of the slurry polymerization reactor and recycled. Further, inert components can accumulate during slurry polymerization. Therefore, the effluent of the slurry polymerization reactor can comprise up to 40 wt % of inert components. It is to be understood, however, that such a process is still within the meaning of "slurry polymerization."

In present methods, the temperature of the slurry can be between 50° C. to 90° C., 60° C. to 80° C., or 65° C. to 75° C. and the pressure of the slurry polymerization reactor is typically between 400 psig to 800 psig, 450 psig to 600 psig, or 480 psig to 560 psig. In some cases, slurry polymerization can be performed at a temperature which is higher than the critical temperature of the polymerization medium. Such reaction conditions are often referred to as "supercritical conditions." The phrase "supercritical fluid" is used to denote a fluid or fluid mixture at a temperature and pressure exceeding the critical temperature and pressure of said fluid or fluid mixture.

The slurry polymerization reactor can be any known reactor used for polymerization of α-olefin monomer. The slurry polymerization reactor can be a continuous stirred tank reactor, a loop reactor, and the like. In any embodiment, slurry polymerization can be performed in a loop reactor in which a slurry is circulated with high velocity along a closed pipe by a circulation pump. Examples of loop reactors include U.S. Pat. Nos. 4,582,816, 3,405,109, 3,324,093, EP 479186, and U.S. Pat. No. 5,391,654.

As described herein, a slurry can be withdrawn from the reactor either continuously or intermittently. Intermittent withdrawal can include the use of settling legs where the solids concentration of the slurry is allowed to increase before withdrawing a batch of the concentrated slurry from the reactor. The use of settling legs is disclosed in, for example, U.S. Pat. Nos. 3,374,211, 3,242,150, and EP 1310295. Continuous withdrawal is disclosed in, for example, EP 891990, EP 1415999, EP 1591460, and EP 1860125. In any embodiment, continuous withdrawal methods can be combined with a suitable concentration method, such as those disclosed in EP 1860125 and EP 1591460.

In the present methods, hydrogen is used in the slurry polymerization reactor as a chain transfer agent to control the molecular weight of the polyolefin. In any embodiment, the slurry has a molar ratio of hydrogen to α-olefin monomer between 0.001 to 0.03, 0.005 to 0.03, and 0.006 to 0.03. In addition, other process additives can also be introduced into the slurry polymerization reactor to facilitate a stable operation of the process such as chain transfer agents, antistatic agents, antifouling agents, scavengers, and the like.

In any embodiment, the present methods include two step or two stage polymerization. The first step or first stage is slurry polymerization in the slurry polymerization reactor. The second step or second stage is gas phase polymerization in a gas phase polymerization. Two stage polymerization can be referred to as sequential polymerization. Here, slurry polymerization of α-olefin monomer is continued in a gas phase polymerization (in a gas phase polymerization reactor as described immediately below). More specifically, in the present methods, the effluent from the slurry polymerization reactor comprising polyolefin is fed to the gas phase polymerization reactor directly without a flash step between reactors. Other process utilizing sequential polymerization are described, for example, in EP 887379, EP 887380, EP 887381, and EP 991684. Furthermore, as described herein, between slurry polymerization and gas phase polymerization, hydrogen is vented from the polymerization medium in an amount of at least 80 percent.

Gas Phase Polymerization Reactor—Fluidized Bed Reactors

As described above, the subject methods include a second step of gas phase polymerization carried out in sequence with slurry polymerization. In any embodiment, polyolefin generated in a slurry polymerization reactor continues to be polymerized in the gas phase reactor in the presence of a polymerization catalyst and after hydrogen has been vented from the effluent of the slurry polymerization reactor.

In any embodiment, antistatic agents can be introduced into the gas phase polymerization reactor if needed. Suitable antistatic agents and methods to use them are disclosed, for example, in U.S. Pat. Nos. 5,026,795, 4,803,251, 4,532,311, 4,855,370, and EP560035. Antistatic agents can include polar compounds such as water, ketones, aldehydes, alcohols, and the like.

Polyolefin particles generated in a gas phase polymerization reactor can be fluidized with the help of a fluidization gas that includes olefin monomer, comonomer(s), inert gas, and the like. As shown in the FIGS. 1, 2 and 3, the polymerization medium is introduced into an inlet chamber at the bottom of the gas phase polymerization reactor. In any embodiment, gas phase polymerization reactors can contain a fluidized bed that includes growing polyolefin particles containing the active catalyst are located above a fluidization grid. To ensure that gas flow is uniformly distributed over the cross-sectional surface area of the inlet chamber, an inlet pipe can be equipped with a flow dividing element as disclosed in, for example, U.S. Pat. No. 4,933,149 and EP 684871.

From the inlet chamber, gas flow within a gas phase polymerization reactor is passed upwards through a fluidization grid into the fluidized bed. The purpose of the fluidization grid is to divide the gas flow evenly through the cross-sectional area of the fluidized bed. In any embodiment, the fluidization grid can be arranged to establish a gas stream to sweep along the reactor walls, as disclosed, for example, in WO 05/087361. Other types of fluidization grids are disclosed, for example, in U.S. Pat. No. 4,578,879, EP 600414, and EP 721798. An overview of fluidization bed reactor function is given in Geldart and Bayens: The Design of Distributors for Gas-fluidized Beds, Powder Technology, Vol. 42, 1985.

When fluidization gas is contacted with the bed containing active catalyst, the reactive components of the gas (i.e., α-olefin monomers and polyolefins) will react in the presence of the catalyst to produce the high molecular weight polyolefin. Fluidized gas is primarily heated via the exothermic reaction.

Unreacted fluidization gas can be removed from the top of the reactor and cooled in a heat exchanger to remove the heat of reaction. Unreacted fluidized gas is cooled to a temperature which is lower than that of the bed to prevent the bed from heating because of the reaction. It is possible to cool the gas to a temperature where a part of it condenses. When the liquid droplets enter the reaction, they are vaporized. Vaporization heat contributes to the removal of the reaction heat. This kind of operation is called condensed mode and variations of it are disclosed, for example, in WO2007/025640, U.S. Pat. No. 4,543,399, EP699213, and WO94/25495. In any embodiment, condensing agents can be added to a recycle gas stream, as disclosed in EP696293. The condensing agents can include non-polymerizable components, such as n-pentane, isopentane, n-butane or isobutane, and the like.

Figure 1:
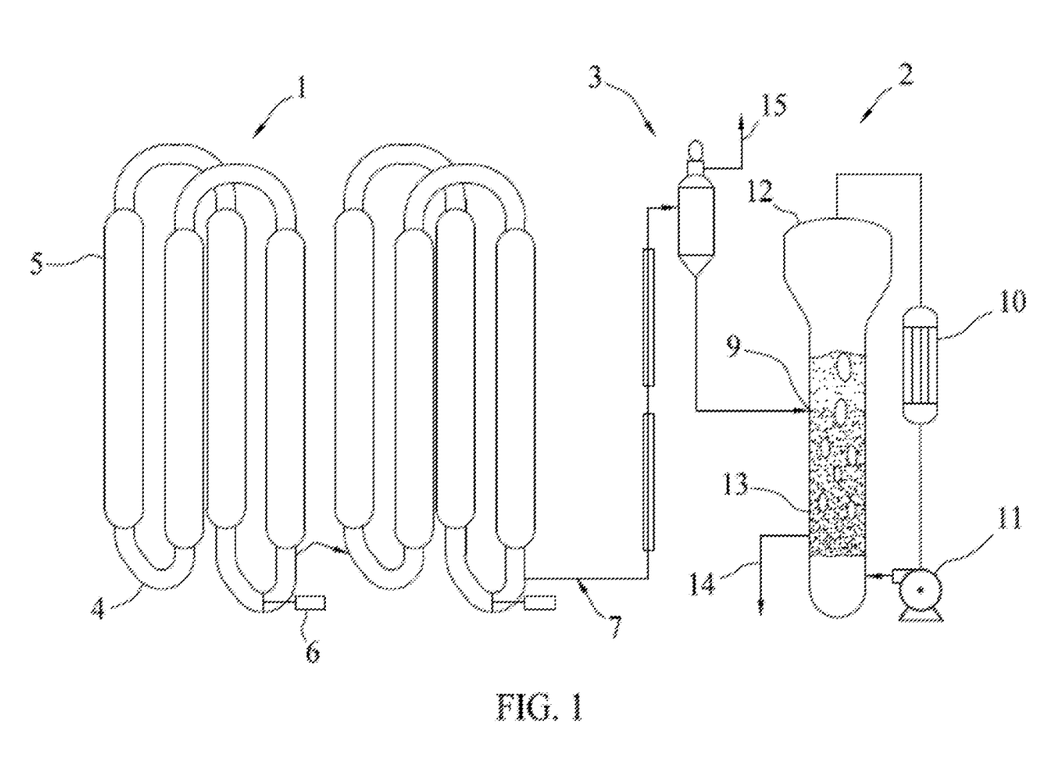
FIG. 1 is a schematic diagram of the two-stage polymerization process for producing polyolefins having high stiffness and broad molecular weight distribution.
Figure 2:
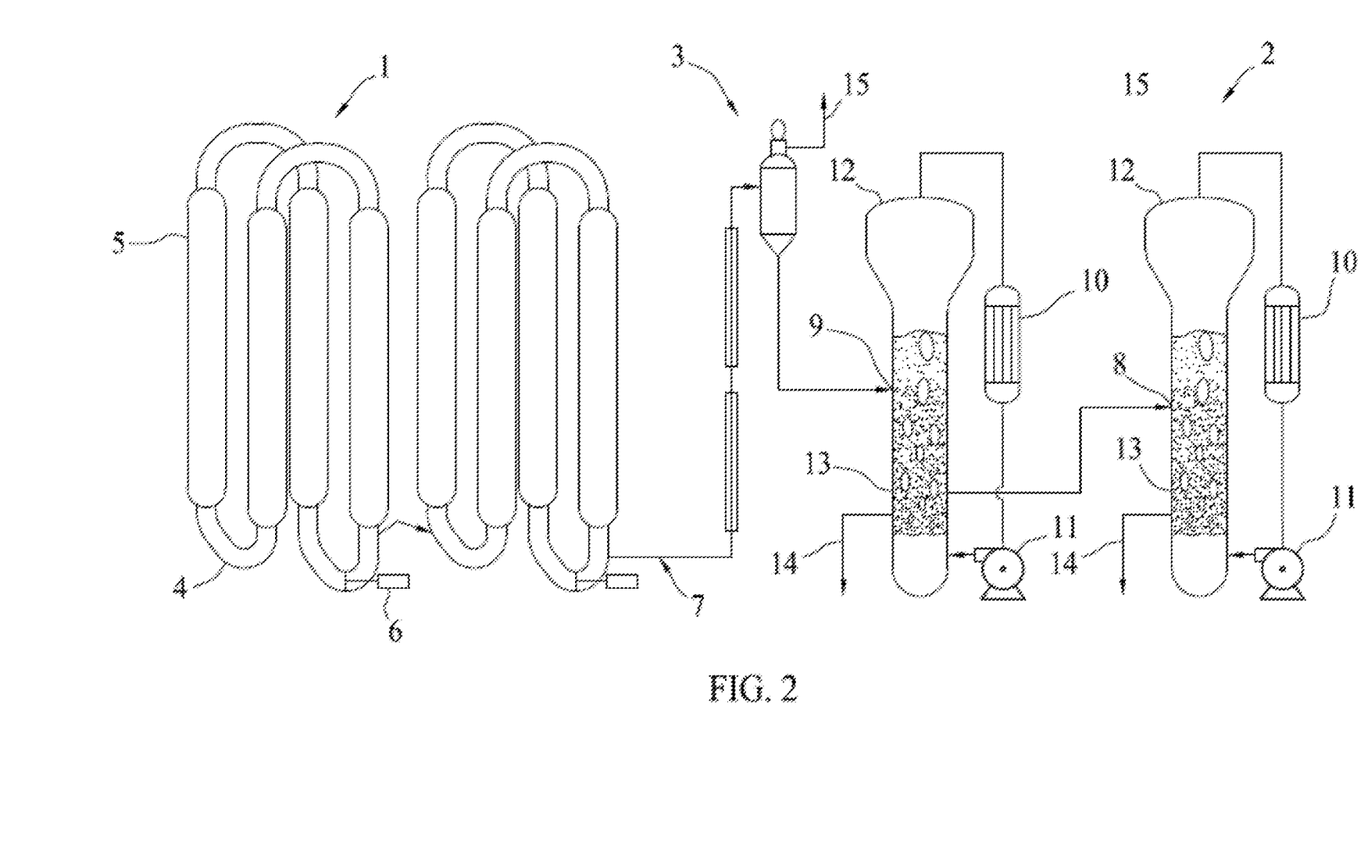
FIG. 2 is a schematic diagram of a polymerization process for producing impact copolymers having high stiffness and broad molecular weight distribution.
Figure 3:
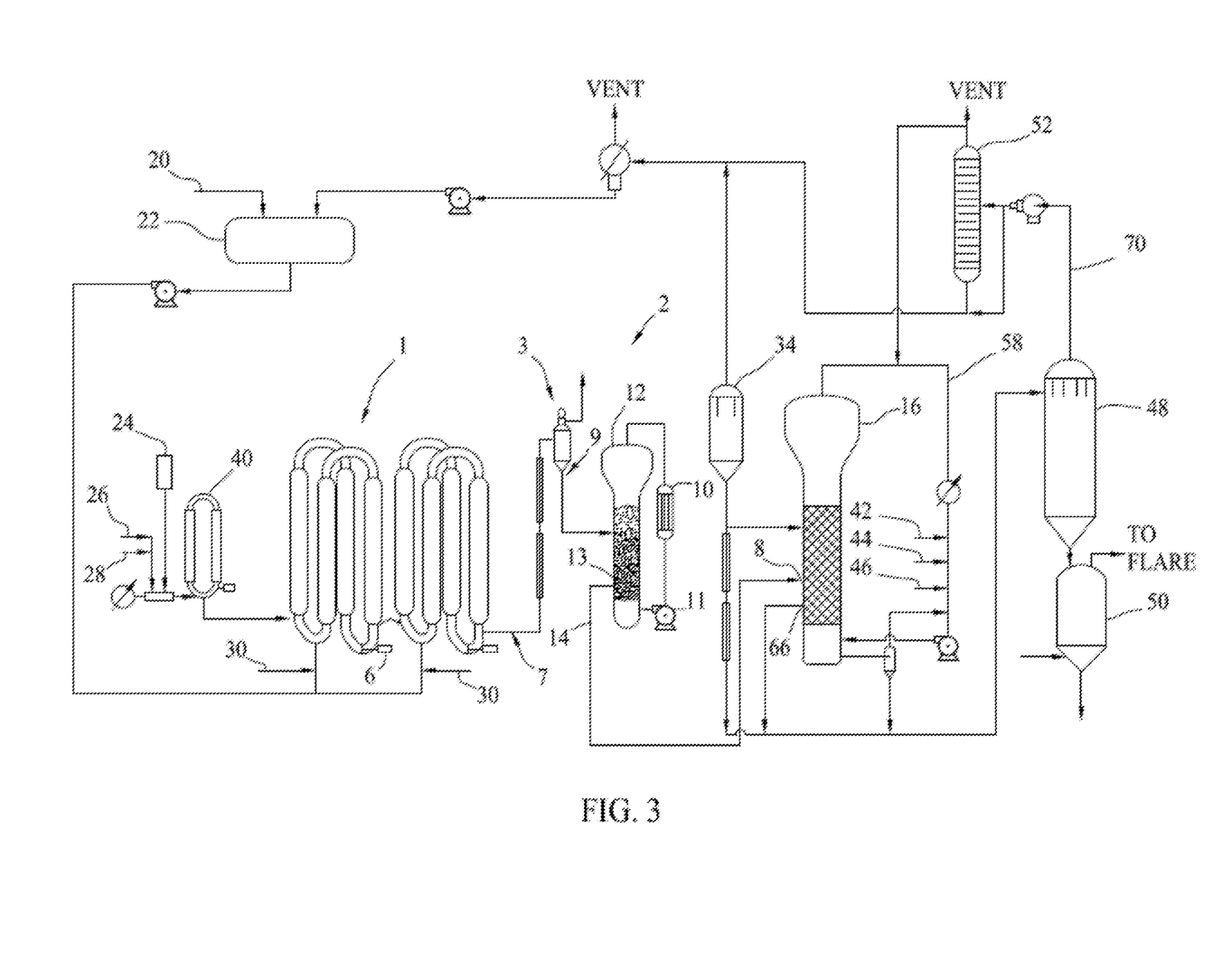
FIG. 3 is a schematic diagram of a polymerization process to produce the propylene-based bimodal polypropylene and impact copolymers having high stiffness and broad molecular weight distribution.

Following recovery from a heat exchanger, as shown in FIGS. 1, 2 and 3, unreacted fluidized gas can be compressed and recycled into the inlet chamber of the reactor. Prior to the entry into a gas phase polymerization reactor, fresh reactants can be introduced into the fluidization gas stream to compensate for the losses caused by the reaction and product withdrawal. The composition of the fluidization gas can be analyzed and used to determine whether additional gas components should be added to maintain the desired reaction conditions.

Catalyst can be introduced into the reactor in various ways, either continuously or intermittently, as discussed, for example, in WO 01/05845 and EP 499759. Where the gas phase polymerization reactor is a part of a reactor cascade, catalyst can be dispersed within the polyolefin particles from a preceding polymerization stage. Polyolefin particles can be introduced into the gas phase polymerization reactor as disclosed in EP 1415999 and WO 00/26258. For example, if a preceding reactor is a slurry reactor, the slurry reactor effluent can be fed directly to the fluidized bed of the gas phase polymerization reactor as disclosed amongst others in EP 887379, EP 887380, EP 887381, and EP 991684.

Polyolefin can be withdrawn from the gas phase polymerization reactor either continuously or intermittently. Combinations of these methods can also be used. By way of example, continuous withdrawal is disclosed in WO 00/29452 and intermittent withdrawal is disclosed in U.S. Pat. No. 4,621,952, EP 188125, EP 250169 and EP 579426.

More specifically, the gas phase polymerization reactor can further include a disengagement zone in which the diameter of the reactor is increased to reduce the gas velocity and allow the particles that are carried from the bed with the fluidization gas to settle back to the bed. Further, level of the fluidized bed in the gas polymerization reactor can be observed by different techniques. For instance, the pressure difference between the bottom of the reactor and a specific height of the bed can be recorded over the whole length of the reactor and the bed level calculated based on the pressure difference values in order to determine a time-averaged level. In any embodiment, the level of the fluidized bed can be monitored by ultrasonic sensors or radioactive sensors. Here, instantaneous levels can be obtained, which can then be averaged over time to obtain a time-averaged bed level. In addition, gas phase polymerization reactors can include a mechanical agitator to facilitate mixing within the fluidized bed. An example of suitable agitator design is given in EP 707513.

Gas phase polymerization can also be conducted in a "fast fluidized bed reactor" in which the velocity of the fluidization gas exceeds the onset velocity of pneumatic transport. Then the whole bed is carried by the fluidization gas. The gas transports the polyolefin particles to a separation device, such as cyclone, where the gas is separated from the polyolefin particles.

Polyolefin is transferred to a subsequent reaction zone, such as a settled bed or a fluidized bed or another fast fluidized bed reactor. The gas, on the other hand, is compressed, cooled and recycled to the bottom of the fast fluidized bed reactor. In any embodiment, the polyolefin is transferred from the riser (operated in fast fluidized mode) into a downcomer (operated as settled bed) and the fluidizing gas is then directed to compression and cooling as described above. The combination of fast fluidized bed and settled bed is disclosed, for example, in WO 97/04015, WO 06/022736 and WO 06/120187.

Gas Phase Polymerization Reactor—Settled Bed

Gas phase polymerization can also be performed in a settled bed. In the settled bed the polyolefin flows downward in a plug flow manner in an environment containing reactive components in gaseous phase. The polyolefin powder is introduced into the bed from the top from where it flows downwards due to gravity. In any embodiment, reactants, such as monomer and comonomers, can be introduced at any point of the reactor. However, where the gas flows upwards its velocity should not exceed the minimum fluidization velocity as otherwise no downward flow of powder would be obtained. A gas buffer can be located at the top of the reactor so that reaction gas from previous polymerization zones contained in the polyolefin powder would be removed to the extent possible.

The temperature of the settled bed can be controlled by adjusting the temperature and ratio of the reactant and/or inert gases introduced into the settled bed zone.

The settled bed polymerization zone can be combined with a fluidized bed polymerization zone or fast fluidized bed reaction zone. Thus, the polyolefin is introduced into the top of the settled bed zone from a fluidized bed zone or a fast fluidized bed zone. The polyolefin is withdrawn from the bottom of the settled bed polymerization zone and recycled into the fluidized bed polymerization zone or fast fluidized bed polymerization zone. Polymerization in settled bed is disclosed, for example, in EP 1633466, EP 1484343 and WO 97/04015.

FIGS. 1, 2 and 3 are each a schematic diagram depicting various aspects of the present methodologies as implemented in polymerization process and various apparatus. For example, FIG. 1 shows a two-stage polymerization process including a slurry polymerization reactor 1 and a gas phase polymerization reactor 2. In a first stage, slurry polymerization of α-olefin monomer produces a low molecular weight polyolefin. In a second stage, gas phase polymerization of the low molecular weight polyolefin produces the polyolefin with improved flexural modulus. In any embodiment, the polyolefin can be can produce a bimodal polyolefin having a low molecular weight component and a high molecular weight component. Between the first stage and the second stage, hydrogen is vented from the low molecular weight polyolefin. In any embodiment, in gas phase polymerization, the molar ratio of hydrogen to α-olefin monomer is between 0 to 0.03, 0 to 0.02, and 0 to 0.01. In any embodiment, residence times in the slurry polymerization reactor and the gas phase polymerization reactors can be between 20 minutes to 180 minutes, 30 minutes to 90 minutes, and 40 minutes to 70 minutes.

As shown in FIG. 1, the slurry polymerization reactor 1 is fluidly connected to the gas phase polymerization reactor 2. In any embodiment and as shown, the slurry polymerization reactor is a slurry loop reactor. Also as shown, each loop 4 can have a heat removal jacket 5. In the slurry polymerization reactor 1, α-olefin monomer is contacted with catalyst in hydrogen to produce an effluent 7 comprising low molecular weight polyolefin, hydrogen, α-olefin monomer and catalyst. The effluent 7 is continuously fed to the gas phase polymerization reactor 2. Further, liquid α-olefin monomer (i.e., pure propylene) or α-olefin monomer in solution (i.e., propylene with a diluent) together with polymerization catalyst and hydrogen are cycled through the slurry polymerization reactor 1 with at least one slurry polymerization reactor pump 6.

Hydrogen is vented from the effluent 7 after the slurry polymerization reactor 1 and before the gas phase polymerization reactor 2. In any embodiment and as shown in FIGS. 1 & 2, hydrogen and unreacted olefin monomer are separated from the effluent 7 through a separator 3. In any embodiment, the effluent 7 is fluidly connected to a separator 3. In the separator 3, the effluent 7 separates into a light component stream 15 containing a mixture of unreacted monomer and hydrogen, and a heavy component stream 9 comprising low molecular weight polyolefin and catalyst. In any embodiment, α-olefin monomer can be fed to gas phase polymerization reactor 2, including unreacted α-olefin monomer recycled from the separator 3.

Following separation, as shown in FIG. 1, low molecular weight polyolefin and catalyst are fed to the inlet 9 of the gas phase polymerization reactor 2. As depicted in FIGS. 1, 2 and 3, In any embodiment, the gas phase polymerization reactor 2 is a vertical, cylindrical fluidized bed reactor having an expansion zone 12 above a fluidized bed 13. In the gas phase polymerization reactor 2, during polymerization, a polymerization medium flows into expansion zone 12. Optionally, a recycle stream of taken from the top of the gas phase polymerization reactor is fluidly connected to a cooler 10 and fed to the gas phase polymerization reactor via a compressor 11. Following polymerization, polypropylene can be discharged from the gas phase polymerization reactor outlet 14.

Alternatively, as an option and as FIGS. 2 & 3, polyolefin can be fed to an inlet 8 of a second gas phase polymerization reactor to produce impact copolymer. FIG. 2 shows an exemplary polymerization process for producing impact copolymer. Polyolefin is fed to the inlet 8 of a second gas phase polymerization reactor 16. Polyolefin is combined with olefin monomer and comonomer to generate an impact copolymer. The inlet of the second gas phase polymerization reactor 8 is not limited to the variation shown in FIG. 2 and may be placed in any suitable location. Following polymerization, the impact copolymer is discharged from the outlet 18 from the second gas phase polymerization reactor 16.

FIG. 3 is another schematic of a polymerization process implementing the present methodologies. With reference to FIG. 3, an α-olefin monomer feed 20 of propylene from a feed tank 22 is fed to the slurry polymerization reactor with a circulating flow of propylene and polymerization medium therein driven by pumps. Alternatively, this α-olefin monomer and polymerization medium are fed into a pre-polymerization reactor 40 via feed line 24, the catalyst via an external donor feed line 26, and the activator via feed line 28. Hydrogen, a chain terminating agent, is injected into the slurry polymerization reactor(s) at a reactor input 30. The polymerization medium can comprise hydrogen in an amount of between 500 mppm to 10,000 mppm based on the amount of α-olefin monomer feed, but below a bubble point of the system.

As described herein, low molecular weight polypropylene is continuously drawn from the slurry polymerization reactor 1 and separated from propylene monomer. The propylene monomer can recycle to a tank 22. A transfer line dryer (not shown) can heat the recycle to a temperature to effect vaporization of the olefin (and any optional solvent), but low enough to maintain the integrity of the polyolefin therein, such as polypropylene, such as to keep the polypropylene from becoming sticky and thus fouling the lines, such as a temperature within a range from 50° C. to 120° C., or 140° C.

In any embodiment, as shown in FIG. 3, polypropylene produced can be feed to the second gas phase polymerization reactor 16 through line 64 as shown in FIG. 3 forming propylene-based impact copolymer. To form impact copolymer, bimodal polyolefin from the second separator 34 can be fed to the second gas phase polymerization reactor 16 fluidly connected to gas phase polymerization reactor 2. Hydrogen, ethylene and additional (if necessary) propylene are fed through lines 42, 44 and 46. In any embodiment, ethylene comonomer to propylene ratio in the second gas phase polymerization reactor 16 can be between 0.2 to 1.0, 0.2 to 0.8, or 0.2 to 0.4. In any embodiment, operating temperatures for gas phase polymerization can be between 60° C. to 100° C., 65° C. to 90° C., and 65° C. to 85° C. In any embodiment, operating pressure for gas phase polymerization can be between 400 psig to 800 psig, 450 psig to 600 psig, or 480 psig to 560 psig.

Through the optional step, ethylene-propylene copolymer can be formed using the same catalyst and external donor in the presence of polypropylene. Ethylene-propylene copolymer forms within the interstitial pockets and pores of the polypropylene particles and a heterogeneous solid mixture comprising a continuous phase of polypropylene and domains of ethylene-propylene copolymer is provided. Impact copolymer can be withdrawn from the second gas phase polymerization reactor at a second gas phase polymerization reactor outlet 66 and feed into line 60 for α-olefin monomer-polyolefin separation and finishing.

Further, the impact copolymer can be recycled 58 to the second gas phase polymerization reactor for further processing of impact copolymer particles. When the particles are a desirable size, impact copolymer can be transferred to a third separator 48, such as a long-retention time dust collector, to further separate olefin from polymer. Both the third separator 48 and a purge bin 50 can be fitted with a probe(s) such as a nuclear density probe(s) to determine the level of polyolefin therein. Impact copolymer product is discharged at outlet 54 for further processing such as by extrusion to form pellets of material.

Also, as shown in FIG. 3, α-olefin monomer (propylene) removed from the second separator 48 can flow to a distillation apparatus 56 (or other separation device) to separate ethylene from propylene and/or other olefins as necessary. The distillation apparatus 46 can be vented or recycled to the second gas phase polymerization reactor 16, or through recycled to the feed tank 22 as shown.

Noteworthy, certain process details provided in FIGS. 1, 2 and 3, such as the compressors and pumps, are for illustrative purposes only and the apparatus and/or the process is not limited by the type of compressors and pumps used to facility and maintain flow of the polymerization medium, monomers, and separated polyolefins and gas.

In any embodiment, polypropylene produced by the present methods can have a melt flow rate at 230° C., 2.16 kg, as calculated according to ASTM 1238, between 0.1 g/10 min to 500 g/10 min., 10 g/10 min to 400 g/10 min, and 20 g/10 min to 300 g/10 min. In any embodiment, impact copolymer can have a melt flow rate at 230° C., 2.16 kg, as calculated according to ASTM 1238, between 0.1 g/10 min to 200 g/10 min, 10 g/10 min to 150 g/10 min, and 30 g/10 to 120 g/10 min.

In any embodiment, polypropylene produced by the present methods can have a Notched Izod impact according to ASTM D256 at 21° C. between 0 J/m to 10 J/m, 0 J/m to 6 J/m, and 1 J/m to 6 J/m. In any embodiment, impact copolymer can have a Notched Izod impact according to ASTM D256 at 21° C. between 0 J/m to 1,000 J/m, 200 J/m to 1,000 J/m, and 400 J/m to 1,000 J/m.

In any embodiment, polypropylene produced by the methods described herein can have a weight average molecular weight as measured by GPC-DRI between 80 kDa to 1,000 kDa, 80 kDa to 500 kDa, and 80 kDa to 200 kDa. In any embodiment, polypropylene produced with the present methods can have a polydispersity, or ratio of weight average molecular weight to number average molecular weight (Mw/Mn), as measured by GPC-DRI between 3 to 40, 2 to 30, or 5 to 20.

Bimodal polypropylene has a multimodal molecular weight distribution with more than one peak or inflection point. As described herein, the bimodal polypropylene produced by the present methods have a high molecular weight component and a low molecular weight component. In any embodiment, polypropylene has a high molecular weight component having a weight average molecular weight as measured by GPC-DRI between 400 kDa to 1,000 kDa, 400 kDa to 900 kDa, and 500 kDa to 800 kDa. In any embodiment, low molecular weight component has a weight average molecular weight as measured by GPC-DRI between 20 kDa to 200 kDa, 20 kDa to 175 kDa, and 20 kDa to 150 kDa.

In any embodiment, impact copolymer produced with the present methods have a weight average molecular weight as measured by GPC-DRI between 50 kDa to 500 kDa, 100 kDa to 350 Dal, and 120 kDa to 280 kDa. In any embodiment, impact copolymer produced with the present methods have a polypropylene matrix having a polydispersity, or ratio of weight average molecular weight to number average molecular weight (Mw/Mn), as measured by GPC-DRI that ranges from 3 to 40, 2 to 30, or 5 to 20.

Additional features of the inventive methods are described in the following non-limiting examples.

EXAMPLES

Generally, polymer solutions are prepared by placing dry polymer in a glass container, adding the desired amount of TCB, then heating the mixture at 160° C. with continuous agitation for 2 hours. All quantities are measured gravimetrically. The TCB densities used to express the polymer concentration in mass/volume units are 1.463 g/ml at room temperature (22° C.) and 1.324 g/ml at 135° C. The injection concentration can range from 1.0 to 2.0 mg/ml, with lower concentrations being used for higher molecular weight samples. Gel Permeation Chromatography was otherwise performed as described above to determine molecular weight characteristics.

Prior to running each sample, the DRI detector and the injector are purged. Flow rate in the apparatus is then increased to 0.5 ml/minute, and the DRI allowed to stabilize for 8 to 9 hours before injecting the first sample. The LS laser is turned on 1 to 1.5 hours before running samples.

Melt Flow Rate (MFR): MFR was measured as per ASTM D1238, condition L or ISO 1133B at 230° C. and 2.16 kg load using a melt indexer. The "Melt Index", such as for the plastomer in the compositions, is tested similarly at 190° C.

Flexural Modulus: The flexural modulus was measured according to ASTM D790, using a crosshead speed of 1.27 mm/min, and a support span of 50 mm using an Instron machine. The flexural modulus chord was measured as per ISO 178 test method, at a crosshead speed of 2 mm/min and 64 mm support span using an Instron machine.

Tensile Strength: The tensile strength at yield, elongation at yield and elongation at break were measured as per ASTM D638 or ISO 527, with a crosshead speed of 50 mm/min, using an Instron Machine.

Comparative Polypropylene and Impact Copolymer Polymerization in Ziegler Natta Catalyst Flexural modulus (stiffness) is an important property for polypropylene ("PP") or impact polypropylene copolymers ("ICP"). Therefore, we tested a process to increase the stiffness of the polypropylene and obtained high molecular weight polypropylene having a 15% higher stiffness than traditional polypropylene produced in a slurry. We then tested for stiffness improvement of impact copolymer.

As described above, the inventive process includes as a first step, the polymerization of propylene in a slurry polymerization reactor to produce low molecular weight polypropylene, followed by a second step of polymerizing the low molecular weight polypropylene in a gas phase polymerization reactor to produce polypropylene including bimodal polypropylene having a high molecular weight component and a low molecular weight component. Between the steps, hydrogen is vented to remove hydrogen from the gas phase polymerization of the low molecular weight polypropylene. As an option, ethylene-propylene rubber can be produced as an impact polypropylene copolymer where bimodal polypropylene is fed to yet another gas phase polymerization reactor and polymerized together with a copolymer.

Lab Scale Synthesis of Traditional Polypropylene Produced in a Slurry

On a laboratory scale, we established a "traditional" polypropylene polymerization process in a slurry in order to provide comparative polypropylene. In this process, $N_2$ was used to purge a 2 liter ("2 L") slurry polymerization reactor. Certain operating parameters were then used in the 2 L slurry polymerization reactor as provided in Table 1 to produce comparative polypropylene ("PP").

TABLE 1

Traditional Polypropylene Production in a Slurry

| | |
|---|---|
| Catalyst | Ziegler Natta |
| Catalyst Amount, mg | 75 |
| TEAl, Ml | 2 |
| Donor | DCPMS and PTES |
| Donor, mL | 2 |
| Hydrogen, scc, 1 atm, 70° F. | 3500 |
| Propylene, mL, 70° F., 650 psi | 1200 |
| Temperature, ° C. | 70 |
| Run Time, min | 60 |

More specifically, in this traditional slurry, once purged with nitrogen, an DCPMS and PTES donor mix and co-catalyst tetraethyl aluminum (TEAl) were added to the slurry phase reactor. Hydrogen was then added. To start the reaction, catalyst and propylene were added. Polymerization of the propylene monomer was performed at a temperature between 60° C. and 80° C. for 60 min. The polymerization reaction was then stopped by cooling the 2 L slurry polymerization reactor and propylene monomer was vented. Table 1 provides the experimental details for the production of "traditional" polypropylene that is used for as comparatives in FIGS. 3 & 4.

Lab Scale Synthesis of Impact Copolymer

In another lab synthesis, and in order to produce comparative impact copolymers, the slurry polymerization described immediately above was performed. Propylene monomer was vented from the slurry polymerization reactor and pressurized so to provide propylene feed to a gas phase polymerization reactor. Ethylene was then added to a gas phase polymerization reactor and the gas mole ratio of gas mole ratio of propylene and ethylene were controlled to provide an ethylene-propylene rubber or impact copolymer.

Figure 5:
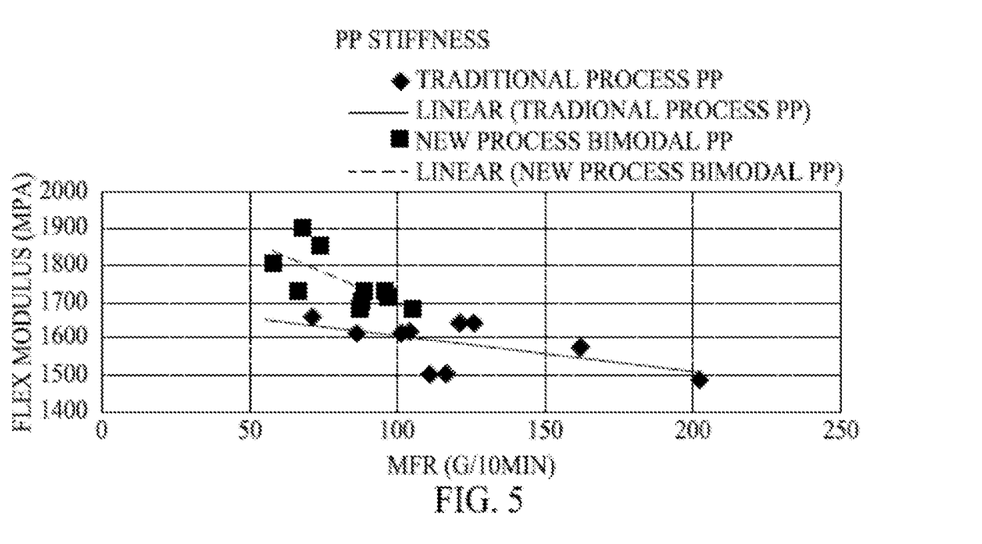
FIG. 5 is a graph that provides a comparison of polypropylene stiffness (flexural modulus) versus molecular weight distribution for polypropylene produced with traditional processing and polypropylene produced with the present methodologies.

Table 2 provides the experimental details for the production of "traditional" impact copolymers that is used for as comparatives in FIG. 5.

TABLE 2

Traditional Impact Copolymer Production

| Slurry Polymerization | |
|---|---|
| Catalyst | Ziegler Natta |
| Catalyst Amount, mg | 75 |
| TEAl, mL | 2 |
| Donor | DCPMS and PTES |
| Hydrogen, scc, 1 atm, 70° F. | 3500 |
| Propylene, mL, 70° F., 650 psi | 1200 |
| Temperature, ° C. | 70 |
| Run Time, min | 60 |
| Gas Phase Polymerization | |
| Gas Phase Temperature, ° C. | 70 |
| Gas Phase H2 amount, mol % | 2.5 |
| Gas Phase pressure, psig | 180 |
| Gas Phase Ethylene, mol % | 30 |
| Gas Phase Propylene, mol % | 67.5 |
| Gas Phase Run Time, min | 30 |

Lab Scale Synthesis of High Stiffness Polypropylene

In this example, polypropylene was prepared by synthesizing low molecular weight polypropylene in a slurry polymerization reactor, followed by the synthesis of polypropylene in a gas phase polymerization reactor. In preparation for the reaction, Na was used to purge a 2 L reactor and a DCPMS and PTES donor and co-catalyst tetraethyl aluminum (TEAl) was added. The slurry reactor was then charged with hydrogen and the catalyst, and propylene was added to initiate the polymerization reaction. The reaction was performed at 70±10° C. for 30 minutes. Propylene monomer and hydrogen were vented and hydrogen concentration was decreased by more than 80%. Polymerization was then continued in a gas phase polymerization reactor to produce a high molecular weight polypropylene. Table 3 immediately below sets out the operating parameters to produce the high molecular weight polypropylene.

TABLE 3

Exemplary High Molecular Weight Polypropylene Production

| Slurry Polymerization | |
| --- | --- |
| Catalyst | Ziegler Natta |
| Catalyst Amount, mg | 75 |
| TEAl, mL | 2 |
| Donor | DCPMS and PTES |
| Hydrogen, scc, 1 atm, 70° F. | 3500 |
| Propylene, mL, 70° F., 650 psi | 1200 |
| Temperature, ° C. | 70 |
| Run Time, min | 30 |
| Gas Phase Polymerization | |
| Gas Phase Temperature, ° C. | 70 |
| Reactor Pressure, psig | 180 |
| Gas Phase H2 amount, mol % | 0.2 |
| Polypropylene, mol % | 99.8 |
| Gas Phase Run Time, min | 30 |

Polypropylene prepared by the comparative process set out in Table 1 and exemplary processes set out in Table 3 were assayed for melt flow ratio ("MFR"), weight average molecular weight (Mw), MWD, otherwise referred to molecular weight distribution (Mw/Mn), and flexural modulus (to measure stiffness). The results are shown immediately below in Table 4.

Figure 4:
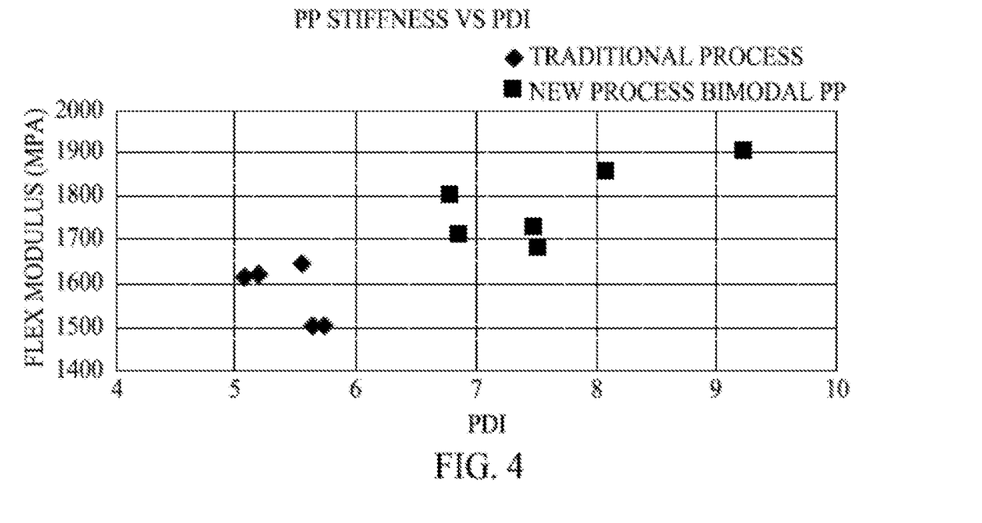
FIG. 4 is a graph that provides a comparison of polypropylene stiffness (flexural modulus) versus molecular weight distribution produced with traditional processing to polypropylene produced with the present methodologies.

The flexural modulus of the high molecular weight polypropylene as a function of MFR is shown in FIG. 4. The flexural modulus of the polypropylene as a function of MWD is shown in FIG. 5.

Lab Scale Synthesis of High Stiffness Impact Copolymer

To produce impact polypropylene copolymer having high stiffness, instead of stopping the reaction, a mixture of polypropylene and ethylene comonomers were added to a second gas phase polymerization reaction. The gas mole ratio of propylene and ethylene was controlled during synthesis of the impact copolymer (ethylene-propylene rubber). Table 5 immediately below sets out the operating parameters to produce the impact copolymer.

TABLE 5

Exemplary Impact Copolymer Production

| Slurry Polymerization | |
| --- | --- |
| Catalyst | Ziegler Natta |
| Catalyst Amount, mg | 75 |
| TEAl, mL | 2 |
| Donor | DCPMS and PTES |
| Hydrogen, scc, 1 atm | 3500 |
| Propylene, mL | 1200 |
| Temperature, ° C. | 70 |
| Reactor Pressure, psig | 650 |
| Run Time, min | 30 |
| Gas Phase Polymerization | |
| Gas Phase Temperature, ° C. | 70 |
| Reactor Pressure, psig | 180 |
| Gas Phase $H_2$ amount, mol % | 0.2 |
| Gas Phase Propylene, mol % | 99.8 |
| Gas Phase Run Time, min | 30 |

TABLE 4

Comparative and Exemplary Polypropylene

| | Sample | MFR, g/10 min | Mw, Da | MWD, Mw/Mn | Flexural modulus (1% secant), MPa |
| --- | --- | --- | --- | --- | --- |
| Comparative polypropylene | C1 | 110.81 | 171051 | 5.64 | 1506 |
| | C2 | 116.39 | 177181 | 5.74 | 1507 |
| | C3 | 121.14 | 173084 | 5.56 | 1645 |
| | C4 | 103.92 | 173561 | 5.2 | 1624 |
| | C5 | 101.39 | 183611 | 5.08 | 1619 |
| | C6 | 202.26 | — | — | 1491 |
| | C7 | 161.85 | — | — | 1579 |
| | C8 | 86.07 | — | — | 1618 |
| Exemplary Polypropylene | E1 | 87.26 | 194646 | 7.51 | 1686 |
| | E2 | 88.45 | 207684 | 7.47 | 1732 |
| | E3 | 67.78 | 258614 | 9.21 | 1906 |
| | E4 | 57.691 | 228936 | 6.78 | 1809 |
| | E5 | 96.41 | 200670 | 6.84 | 1716 |
| | E6 | 73.77 | 253369 | 8.08 | 1857 |
| | E7 | 105.24 | — | — | 1684 |
| | E8 | 87.13 | — | — | 1707 |
| | E9 | 66.32 | — | — | 1734 |
| | E10 | 96.22 | — | — | 1729 |

TABLE 5-continued

Exemplary Impact Copolymer Production

Second Gas Phase Polymerization

| | |
|---|---|
| Gas Phase Temperature, ° C. | 70 |
| Reactor pressure, psig | 180 |
| H$_2$, mol % | 2.5 |
| Ethylene, mol % | 30 |
| Propylene, mol % | 67.5 |
| Run Time, min | 30 |

Figure 6:
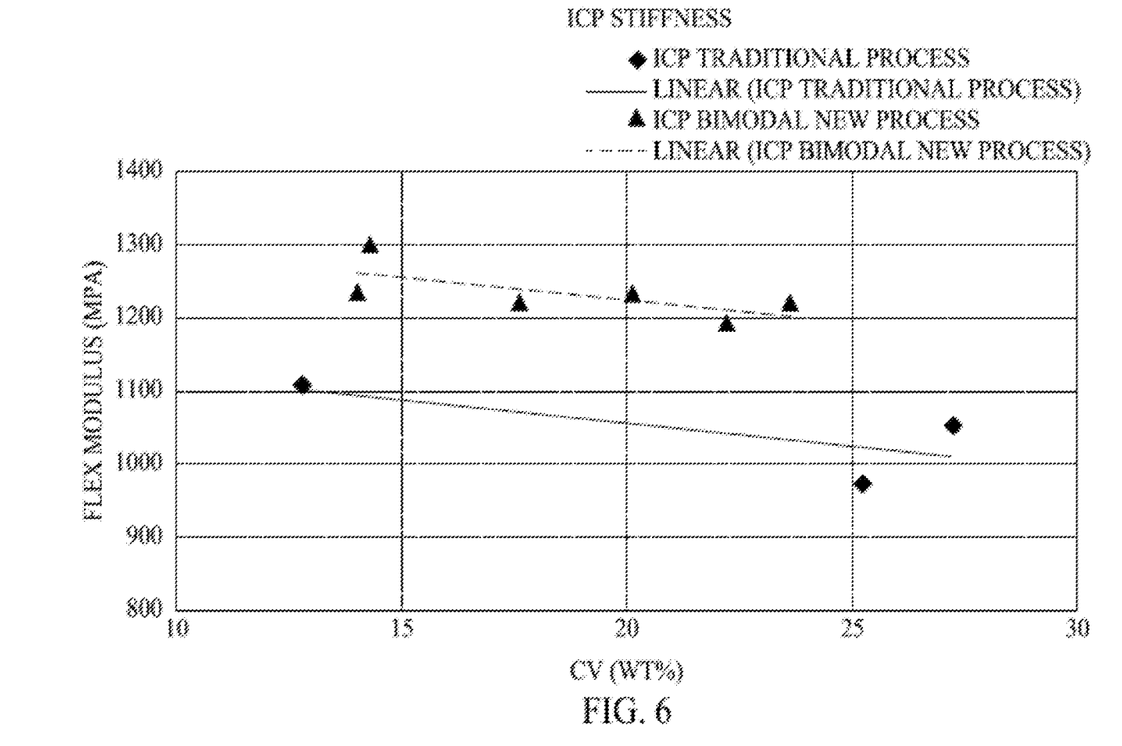
FIG. 6 is a graph comparing the flexural modulus (stiffness) of the impact copolymer made by the traditional process with the flexural modulus of the impact copolymer made by the methods described herein, and further shows flexural modulus as a function of weight percent (wt. %).

Impact copolymers prepared by exemplary process above and set out in Table 4 and by the traditional comparative process (Table 2) were assayed for MFR, content of total internal rubber phase, ethylene content of the rubber phase, and flexural modulus. Results are shown in Table 6 immediately blow. FIG. 6 is a chart comparing the flexural modulus (stiffness) of the impact copolymer made by the traditional process with the flexural modulus of the impact copolymer made by the methods described herein and also shows flexural modulus as a function of weight percent (wt. %).

TABLE 6

Comparative and Exemplary Impact Copolymers

| ICP Process | Sample | MFR, g/10 min | Rubber Content, Wt % | C2 wt % in rubber | Flexural modulus (1% secant), MPa |
|---|---|---|---|---|---|
| Comparative ICP | C9 | 34.42 | 25.2 | 57.6 | 975 |
| | C10 | 89.98 | 12.8 | 54.4 | 1110 |
| | C11 | 39.62 | 27.2 | 55 | 1055 |
| Exemplary ICP | E11 | 37.82 | 22.2 | 55.9 | 1193 |
| | E12 | 39.57 | 14 | 56.2 | 1235 |
| | E13 | 32.18 | 17.6 | 54.6 | 1223 |
| | E14 | 33.86 | 20.1 | 53.3 | 1235 |
| | E15 | 47.63 | 14.3 | 53.2 | 1301 |
| | E16 | 37.953 | 23.6 | 65.2 | 1223 |

It is to be understood that this disclosure is not limited to specific compounds, components, compositions, reactants, reaction conditions, ligands, catalyst structures, metallocene structures, or the like, as such may vary, unless otherwise specified. It is also to be understood that the terminology used herein is for the purpose of describing particular aspects only and is not intended to be limiting.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

The invention claimed is:

1. A method for producing polyolefin comprising the steps of:
   polymerizing α-olefin monomers with a catalyst and hydrogen in a slurry to produce a low molecular weight polyolefin having a weight average molecular weight between 20 kDa to 200 kDa;
   venting hydrogen from the low molecular weight polyolefin; and
   polymerizing the low molecular weight polyolefin and α-olefin monomers in the presence of catalyst having a mole ratio of hydrogen to α-olefin monomers of between 0 to 0.01 to produce polyolefin having a molecular weight distribution of between 4.0 and 20.0 and a flexural modulus between 1500 mPa and 2500 mPa.

2. The method of claim 1, wherein the α-olefin monomers are propylene and the polyolefin is polypropylene.

3. The method of claim 2, further comprising the steps of venting the propylene monomers from the polypropylene and polymerizing the polypropylene with ethylene and propylene in a second gas phase to produce a polypropylene impact copolymer having a weight average molecular weight between 120 kDa and 280 kDa.

4. The method of claim 1, wherein propylene monomer is recycled to the slurry phase polymerization reactor.

5. The method of claim 1, wherein the polyolefin has a molecular weight distribution (Mw/Mn) between 5 to 10.

6. The method of claim 1, wherein pressure of the slurry and/or the slurry polymerization reactor is between 480 psig to 650 psig.

7. The method of claim 1, wherein temperature of the slurry and/or the slurry polymerization reactor is between 65° C. and 75° C.

8. The method of claim 1, wherein pressure of the gas phase and/or the gas phase polymerization reactor is between 180 psig to 250 psig.

9. The method of claim 1, wherein temperature of the gas phase and/or the gas phase polymerization reactor is between 65° C. and 85° C.

10. The method of claim 1, wherein reaction residence time in the slurry and/or the slurry polymerization reactor is between 40 minutes to 70 minutes.

11. The method of claim 1, wherein a residence time in the gas phase and/or the gas phase polymerization reactor is between 80 minutes to 150 minutes.

12. The method of claim 1, wherein hydrogen is fed to the slurry and/or the slurry polymerization reactor at a flow rate between 2500 sccm to 3500 sccm.

13. The method of claim 2, wherein the polypropylene has a melt flow rate (230° C./2.16 kg) within a range of from 0.1 g/10 min to 500 g/10 min.

14. The method of claim 3, wherein the impact copolymer has a melt flow rate (230° C./2.16 kg) within a range of from 0.1 g/10 min to 200 g/10 min.

15. The method of claim 1, wherein the α-olefin monomers, the catalyst and hydrogen are prepolymerized.

16. A method for producing polypropylene comprising the steps of:
- reacting propylene monomer with a catalyst and hydrogen in a slurry to produce a low molecular weight polypropylene having a weight average molecular weight (Mw) of between 20 kDa and 150 kDa wherein a mole ratio of hydrogen in the slurry to propylene monomer is between 0.006 to 0.03;
- venting hydrogen from the low molecular weight polypropylene; and
- polymerizing the low molecular weight polypropylene in a gas phase to produce polypropylene having a weight average molecular weight of between 500 kDa to 800 kDa, a molecular weight distribution of between 6.5 and 30 and a flexural modulus of at least 1500 mPa.

17. A method for producing polypropylene comprising the steps of:
- contacting a propylene monomer with a catalyst in hydrogen in a slurry polymerization reactor to produce an effluent comprising a low molecular weight polypropylene having a weight average molecular weight between 20 kDa to 200 kDa, hydrogen, and propylene monomer;
- venting hydrogen from the effluent; and
- feeding the effluent into a gas phase polymerization reactor to produce polypropylene having a molecular weight distribution of between 4.0 and 30 and a flexural modulus between 1500 mPa and 2500 mPa, wherein a mole ratio of hydrogen to propylene monomer in the gas phase is between 0 to 0.01.

18. The method of claim 17, wherein the effluent is continuously or intermittently withdrawn from the slurry polymerization reactors.

19. The method of claim 17, further comprising the step of polymerizing the polypropylene with ethylene and propylene in a second gas phase polymerization reactor and without hydrogen to produce an impact copolymer.

20. The method of claim 19, wherein a second effluent is drawn from the second gas phase polymerization reactor and the second effluent comprises the impact copolymer.

* * * * *